(12) United States Patent
Oki et al.

(10) Patent No.: US 6,761,759 B2
(45) Date of Patent: Jul. 13, 2004

(54) INK COMPOSITION, INK JET RECORDING METHOD AND RECORDED MATTER

(75) Inventors: Yasuhiro Oki, Nagano-ken (JP);
Kazuhiko Kitamura, Nagano-ken (JP);
Tetsuya Aoyama, Nagano-ken (JP);
Kyoichi Oka, Nagano-ken (JP); Nobuo Uotani, Chiba-ken (JP); Hiroshi Takahashi, Chiba-ken (JP); Yuji Ito, Chiba-ken (JP)

(73) Assignee: Seiko Epson Corporation, Tokyo (JP)

( * ) Notice: Subject to any disclaimer, the term of this patent is extended or adjusted under 35 U.S.C. 154(b) by 108 days.

(21) Appl. No.: 10/103,657

(22) Filed: Mar. 21, 2002

(65) Prior Publication Data

US 2003/0010253 A1 Jan. 16, 2003

(30) Foreign Application Priority Data

Mar. 30, 2001 (JP) ..................................... 2001-102702
Mar. 30, 2001 (JP) ..................................... 2001-102703

(51) Int. Cl.$^7$ ......................... C09D 11/00; C09D 11/02; B41J 2/01
(52) U.S. Cl. ............................. 106/31.43; 106/31.47; 106/31.49; 106/31.58; 106/31.75; 106/31.86; 347/100
(58) Field of Search ................... 106/31.43, 31.47, 106/31.49, 31.58, 31.75, 31.86; 347/100

(56) References Cited

U.S. PATENT DOCUMENTS

| | | | | |
|---|---|---|---|---|
| 3,906,141 A | * | 9/1975 | Anderson et al. | 428/211.1 |
| 5,492,952 A | * | 2/1996 | Tonogaki et al. | 524/192 |
| 5,527,385 A | * | 6/1996 | Sumii et al. | 106/31.17 |
| 5,599,859 A | * | 2/1997 | Tonogaki et al. | 524/95 |
| 6,372,030 B1 | * | 4/2002 | Malhotra et al. | 106/31.32 |
| 6,485,552 B2 | * | 11/2002 | Kubota et al. | 106/31.27 |
| 2001/0029868 A1 | * | 10/2001 | Kubota et al. | 106/31.43 |
| 2002/0185036 A1 | * | 12/2002 | Oki et al. | 106/31.46 |
| 2003/0070582 A1 | * | 4/2003 | Kitamura et al. | 106/31.46 |

FOREIGN PATENT DOCUMENTS

| | | |
|---|---|---|
| JP | 5125318 | 5/1993 |
| JP | 5132638 | 5/1993 |
| JP | 5132639 | 5/1993 |
| JP | 6271799 | 9/1994 |
| JP | 83497 | 1/1996 |
| JP | 8188733 | 7/1996 |
| JP | 9272812 | 10/1997 |
| JP | 11170686 | 6/1999 |

OTHER PUBLICATIONS

Patent Abstracts of Japan Publication No. 11–170686 dated Jun. 29, 1999.
Patent Abstracts of Japan Publication No. 08–003497 dated Jan. 9, 1996.
Patent Abstracts of Japan Publication No. 09–272812 dated Oct. 21, 1997.
Patent Abstracts of Japan Publication No. 08–188733 dated Jul. 23, 1996.
Patent Abstracts of Japan Publication No. 06–271799 dated Sep. 27, 1994.
Patent Abstracts of Japan Publication No. 05–132638 dated May 28, 1993.
Patent Abstracts of Japan Publication No. 05–125318 dated May 21, 1993.
Patent Abstracts of Japan Publication No. 05–132639 dated May 28, 1993.

* cited by examiner

*Primary Examiner*—Helene Klemanski
(74) *Attorney, Agent, or Firm*—Ladas & Parry

(57) ABSTRACT

The ink composition of the present invention contains a coloring agent, water, a water-soluble organic solvent which is a liquid at least at temperatures of 40° C. or less, and which has a solubility of 1 wt % or greater with respect to water at a temperature of 20° C., and a saturation vapor pressure of 1.7 Pa or less at a temperature of 20° C. (with said organic solvent being contained in the ink composition at the rate of 10 to 35 wt %), and one or more amidine type compounds. As a result, the present invention provides an ink composition, a recording medium, recorded matter and an ink jet recording method that make it possible to obtain images with a high image quality which are superior in terms of the gas resistance of the recorded matter.

34 Claims, No Drawings

INK COMPOSITION, INK JET RECORDING METHOD AND RECORDED MATTER

BACKGROUND OF THE INVENTION

1. Field of the Invention

The present invention relates to an ink composition, an ink jet recording method and recorded matter, and more particularly to [i] an ink jet composition which is superior in terms of the storability of the recorded matter and superior in terms of discharge reliability, with no clogging of the nozzle when used as an ink jet recording ink, and which makes it possible to obtain high-quality images, [ii] an ink jet recording method, and [iii] recorded matter.

2. Description of the Related Art

Ink jet recording methods are printing methods in which recording is performed by causing small droplets of an ink composition to fly through the air, and causing these droplets to adhere to a recording medium such as paper or the like. Such methods are characterized by the fact that sharp images with a high resolution can be printed at a high speed while using a relatively inexpensive apparatus.

In such ink jet recording methods, recording is performed by discharging liquid droplets of ink from a fine nozzle; these liquid droplets must be continuously and stably discharged from the nozzle.

In recent years, furthermore, there has been an increased demand for the maintenance of high quality over a long period of time, without any deterioration in the recorded image. As a result, various means have been devised for improving the storability of recorded images.

For example, the addition of specified compounds to the recording liquid has been proposed in Japanese Patent Application Laid-Open No. H11-170686 as a method of improving the light resistance of recorded images, and the addition of various other light resistance improving agents has also been proposed, along with novel coloring agents and the like.

Light resistance is improved by many of these methods, and storability is greatly improved in cases where images are stored in a configuration in which the images are cut off from the atmosphere and are exposed only to light, as when images are displayed in frames, albums or the like, so that the image quality can be favorably maintained over a long period of time.

On the other hand, there has been in increase in cases where recorded images are displayed "as is" indoors and outdoors in configurations other than the above-mentioned storage configuration, under conditions in which the images come into direct contact with the atmosphere, as in the case of posters, calendars and the like.

In such cases, however, the images are exposed not only to light but also to air; as a result, the problem of a deterioration in the image quality has been encountered. The causes of this deterioration in recorded images are not definitely known; however, it appears that such deterioration results from the effects of various types of oxidizing gases, as typified by ozone and the like, that are present in air.

In particular, in cases where recorded matter is exposed to air for long periods of time, the deterioration of cyan dyes is conspicuous, and the recorded images may show a reddish tinge. Such deterioration of cyan dyes is especially like to occur in cases where recorded matter is stored outdoors.

For example, in Japanese Patent Application Laid-Open No. H7-314882, a method in which the deterioration of recorded images is inhibited by adding compounds selected from a set consisting of thiocyanates and the like to the recording sheet has been proposed as a method for improving the resistance to air (or gases; i.e., [as a method for improving] the gas resistance). In the case of this method, deterioration caused by gases can initially be effectively prevented; however, in cases where the images continue to be exposed to air for a long period of time, the effectiveness of the gas resistance is eventually lost, and an abrupt deterioration begins at the point in time where the effectiveness is lost; as a result, the gas resistance cannot be maintained over a long period of time.

Furthermore, in Japanese Patent Application Laid-Open No. H8-3497, a method in which the gas resistance is improved by adding thiosemicarbazide derivatives, thiocarbohydrazide derivatives or the like to the ink composition has also been proposed. However, there are problems in terms of safety in the case of such additives, so that sufficient verification [of safety] is necessary when these additives are used.

SUMMARY OF THE INVENTION

Accordingly, it is an object of the present invention to provide [i] an ink jet composition which is superior in terms of the storability of the recorded matter and superior in terms of discharge reliability, with no clogging of the nozzle when used as an ink jet recording ink, and which makes it possible to obtain high-quality images, [ii] an ink jet recording method, and [iii] recorded matter.

As a result of diligent research, the present inventor discovered that the gas resistance of recorded images can be improved, and the ink discharge reliability can also be improved, by using a construction in which a coloring agent, water, a water-soluble organic solvent and a carbazide type compound and/or hydrazide type compound are included in the ink composition.

The present invention was devised on the basis of the abovementioned findings, and provides an ink composition which contains a coloring agent, water, a water-soluble organic solvent and one or more carbazide type compounds and/or hydrazide type compounds.

It is desirable that the abovementioned organic solvent be a liquid at least in the temperature range of 0 to 40° C., that the solubility of this solvent with respect to water at a temperature of 20° C. be 1 wt % or greater, and that the saturation vapor pressure of this solvent at a temperature of 20° C. be 1.7 Pa or less; furthermore, it is also desirable that the abovementioned organic solvent be contained in the ink composition at the rate of 10 wt % to 35 wt %.

By using the abovementioned construction, it is possible to improve the gas resistance of the recorded images and the discharge reliability of the ink.

In the abovementioned composition, it is desirable that the composition contain one or more solvents selected from a set consisting of glycerol, 1,5-pentanediol and triethylene glycol as the abovementioned organic solvent.

By using the abovementioned construction, it is possible to improve the gas resistance of the recorded images and the discharge reliability of the ink.

Furthermore, in the abovementioned composition, it is desirable that the carbazide type compounds be compounds that are expressed by the general formula $R^1R^2NCONHNR^3R^4$, $R^1$ through $R^4$ each independently indicates a hydrogen atom, an alkyl group which may be substituted, or an aryl group which may be substituted or compounds that are expressed by the general formula $R^5R^6NNHCONHNR^7R^8$, wherein $R^5$ through $R^8$ each independently indicate a hydrogen atom, an alkyl group which may be substituted, or an aryl group which may be substituted. In particular, $R^5$ through $R^8$ are preferably methyl groups.

Furthermore, in the abovementioned composition, it is preferable that the carbazide type compounds be compounds that have two or more carbazide structures in the same molecule.

By using the abovementioned construction, it is possible to improve the gas resistance of the recorded images and the discharge reliability of the ink.

Furthermore, in the abovementioned composition it is desirable that the hydrazide type compounds be compounds that are expressed by the general formula $R^9CONHNR^{10}R^{11}$, wherein $R^9$ through $R^{11}$ each independently indicate a hydrogen atom, an alkyl group which may be substituted, or an aryl group which may be substituted. In particular, $R^{10}$ and $R^{11}$ are preferably methyl groups.

Furthermore, in the abovementioned composition, it is preferable that the hydrazide type compounds be compounds that have two or more hydrazide structures in the same molecule.

Furthermore, from the standpoint of achieving a further improvement in the gas resistance, it is desirable that the abovementioned hydrazide type compounds be contained in the ink composition at the rate of 0.1 wt % to 10 wt %, and a content of 0.5 wt % to 5 wt % is even more desirable.

In cases where the composition contains both carbazide type compounds and hydrazide type compounds, there are no particular restrictions on the ratio of the two types of compounds; however, it is desirable that the total content of both types of compounds be in the range of 0.1 wt % to 10 wt %, and a total content in the range of 0.5 wt % to 5 wt % is even more desirable.

It is even more desirable that the weight ratio of the content of the abovementioned carbazide type compounds and/or hydrazide type compounds to the content of the above-mentioned organic solvent be in the range of 1:3 to 1:100. By using such a construction, it is possible to achieve a further improvement in the gas resistance of the recorded images and the discharge reliability of the ink.

In the ink composition of the present invention, the composition acts especially effectively in cases where dyes consisting of metal complexes are contained in the composition as the abovementioned coloring agent. If dyes consisting of metal complexes are included in the composition, recorded images that have a high image quality and a superior gas resistance can be obtained. Examples of dyes consisting of metal complexes include phthalocyanine dyes, metal complex azo dyes and the like.

In the abovementioned composition, an even more effective action is obtained in cases where dyes consisting of copper complexes are contained in the composition. In particular, recorded images that are even more superior in terms of gas resistance are obtained in cases where copper phthalocyanine dyes are used. Concrete examples of copper phthalocyanine dyes include C. I. Direct Blue 86, 199 and the like.

In the ink composition of the present invention, an especially effective action is also obtained in cases where the composition contains dyes expressed by the following general formula (B) as the abovementioned coloring agent.

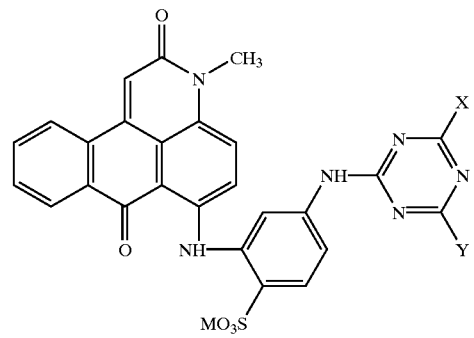

(B)

In the above formula, X indicates an anilino group that is substituted by at least one $SO^3M$, Y indicates OH, Cl or a morpholino group, and M indicates H, Li, Na, K, ammonium or an organic amine.

If such dyes are included in the ink composition, recorded images that have a high image quality and a superior gas resistance can be obtained.

Concrete examples of dyes expressed by general formula (B) include the following:

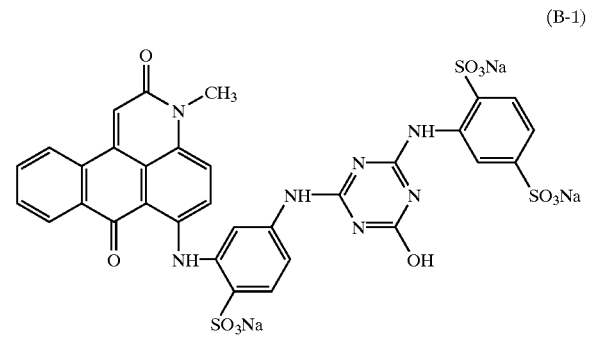

(B-1)

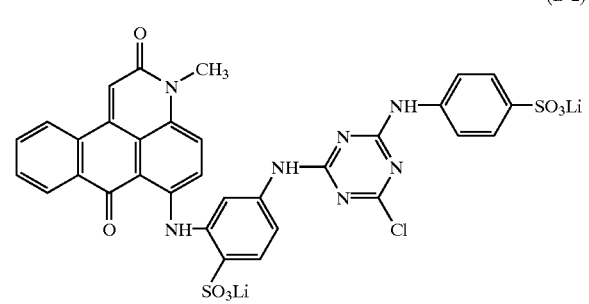

(B-2)

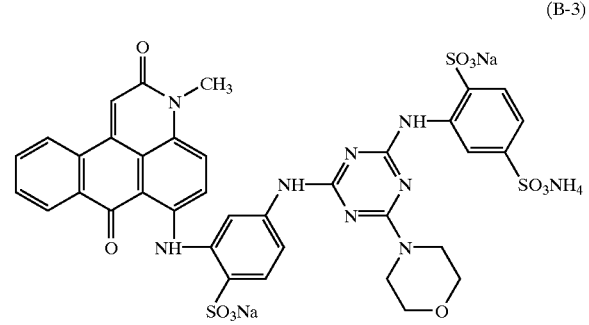

(B-3)

-continued (B-4)
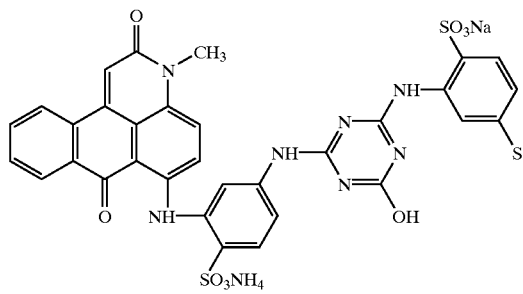

(B-5)
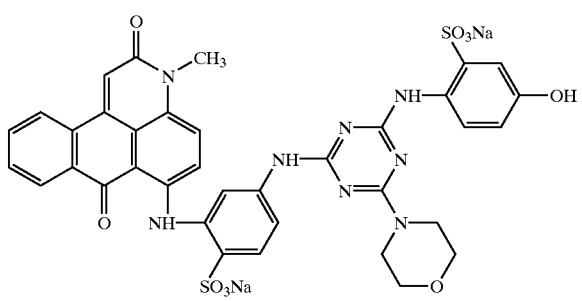

(B-6)
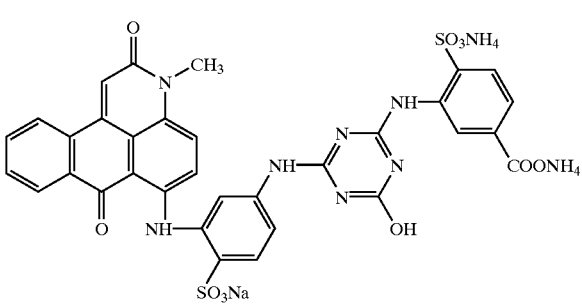

(B-7)
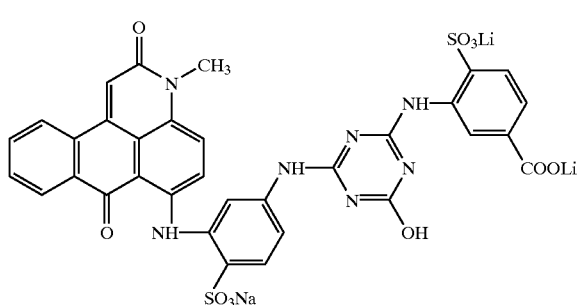

(B-8)
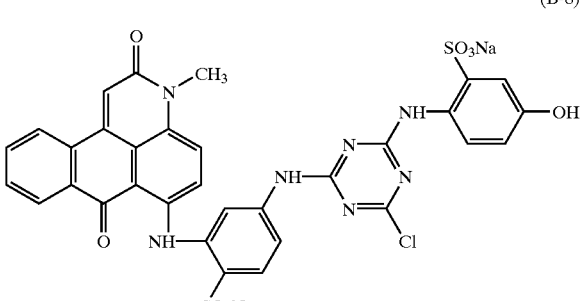

-continued (B-9)
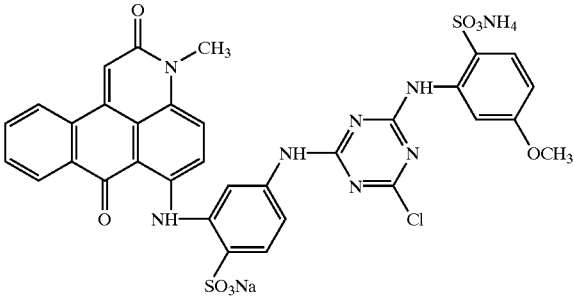

(B-10)
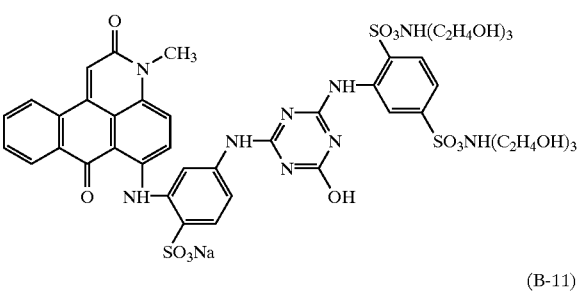

(B-11)
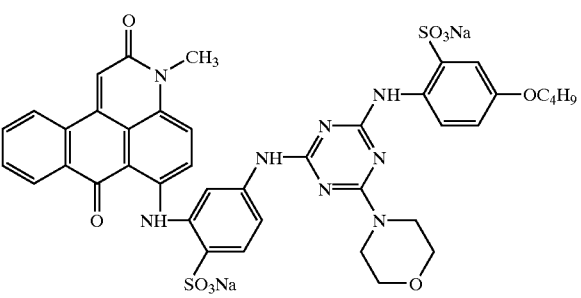

(B-12)
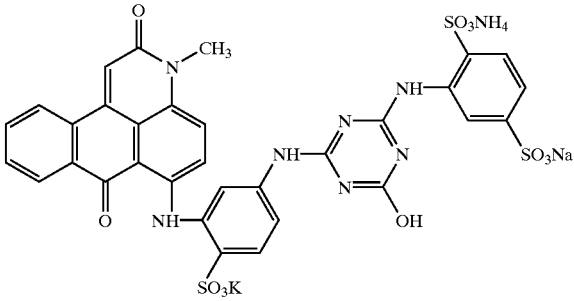

The abovementioned ink composition may also contain one or more acetylene glycol type compounds. By further including acetylene glycol type compounds in the ink composition, it is possible to increase the discharge stability of the ink without causing any deterioration in the gas resistance of the recorded images.

The abovementioned ink composition may also contain one or more glycol ether type compounds. By using glycol ether type compounds as solvents, it is possible to increase the discharge stability of the ink without causing any deterioration in the gas resistance of the recorded images.

The abovementioned ink composition may also contain one or more humectants consisting of tertiary amines.

Furthermore, the ink jet recording method of the present invention is a method in which recording is performed by discharging liquid droplets of an ink composition and causing the liquid droplets to adhere to a recording medium; this method is characterized in that the abovementioned ink composition is used as the ink composition that is discharged.

By using such a recording method, it is possible to obtain recorded matter that is superior in terms of gas resistance.

Furthermore, as a result of diligent research, the present inventor discovered that the gas resistance of the recorded images can be improved by using a construction in which one or more compounds having the following structure (A) are contained in the ink composition as the abovementioned carbazide type compounds and/or hydrazide type compounds.

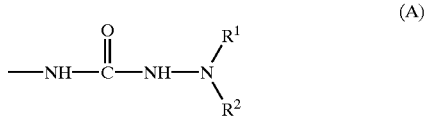
(A)

In the above structure (A), $R^1$ and $R^2$ each independently indicate an alkyl group which may be substituted or an aryl group which may be substituted.

By using the abovementioned construction, it is possible to obtain recorded images that are superior in terms of gas resistance.

Furthermore, in the abovementioned composition, it is desirable that $R^1$ and $R^2$ in the compounds having the abovementioned structure (A) be methyl groups.

Furthermore, in the abovementioned composition, it is preferable that the compounds having the abovementioned structure (A) be compounds that have two or more such structures (A) in the same molecule.

By using the abovementioned construction, it is possible to obtain recorded images that are superior in terms of gas resistance.

From the standpoint of improving the gas resistance, it is desirable that the compounds having the above-mentioned structure (A) be contained in the ink composition at the rate of 0.1 wt % to 10 wt %.

A single compound having the abovementioned structure (A) may be added to the ink composition of the present invention, or a mixture of two or more such compounds may be added. In cases where a mixture of such compounds is added, it is desirable that the total content of these compounds in the ink composition be 0.1 wt % to 10 wt %.

In the abovementioned ink composition as well, it is desirable that the composition contain coloring agents of the type described above.

Furthermore, it is desirable that the abovementioned ink composition contain one or more water-soluble organic solvents which are liquids at least in the temperature range of 0 to 40° C., and in which the solubility with respect to water at 20° C. is 1 wt % or greater, and the saturation vapor pressure at a temperature of 20° C. is 1.7 Pa or less. By including specified water-soluble solvents in the ink composition, it is possible to increase the discharge stability of the ink without causing any deterioration in the gas resistance of the recorded images.

In the abovementioned composition, it is desirable that the composition contain one or more solvents selected from a group consisting of glycerol, 1,5-pentanediol and triethylene glycol as the abovementioned organic solvent.

By using the abovementioned construction, it is possible improve the gas resistance of the recorded images and the discharge reliability of the ink.

From the standpoint of achieving a further improvement in the discharge characteristics, it is desirable that the abovementioned organic solvent(s) be contained in the ink composition at the rate of 10 wt % to 35 wt %.

The abovementioned ink composition may also contain one or more acetylene glycol type compounds. By including acetylene glycol type compounds in the composition, it is possible to increase the discharge stability of the ink without causing any deterioration in the gas resistance of the recorded images.

The abovementioned ink composition may also contain one or more glycol ether type compounds. By using glycol ether type compounds as solvents, it is possible to increase the discharge stability of the ink without causing any deterioration in the gas resistance of the recorded images.

The abovementioned ink composition may also contain one or more humectants consisting of tertiary amines.

Furthermore, the ink jet recording method of the present invention is a method in which recording is performed by discharging liquid droplets of an ink composition and causing the liquid droplets to adhere to a recording medium; this method is characterized in that the abovementioned ink composition is used as the ink composition that is discharged.

By using such a recording method, it is possible to obtain recorded matter that is superior in terms of gas resistance.

DESCRIPTION OF THE PREFERRED EMBODIMENTS

Preferred embodiments of the ink composition of the present invention will be described below.

The ink composition of the present invention contains a coloring agent, water, a water-soluble organic solvent and one or more carbazide type compounds and/or hydrazide type compounds as essential components.

The abovementioned water-soluble organic solvent is a liquid at least in the temperature range of 0 to 40° C. The solubility of this solvent with respect to water at a temperature of 20° C. is 1 wt % or greater, preferably 5 wt % or greater, and the saturation vapor pressure of this water-soluble organic solvent by itself at a temperature of 20° C. is 1.7 Pa or less, preferably 1 Pa or less. Furthermore, the abovementioned organic solvent is contained in the ink composition at the rate of 10 wt % to 35 wt %.

A number of common methods may be used to measure the saturation vapor pressure; however, in the case of a low-volatility solvent such as the abovementioned organic solvent used in the present invention, more accurate measurements can be accomplished by using the transpiration method (gas flow-through method).

The ink composition of the present invention containing the abovementioned organic solvent with the abovementioned characteristics is superior in terms of discharge reliability and printing quality, without causing any drop in the superior gas resistance imparted by means of the abovementioned carbazide type compounds and/or hydrazide type compounds. In particular, in cases where this ink composition is used as an ink jet recording ink, drying of the ink in the nozzle can be prevented, so that clogging of the nozzle can be securely prevented.

It is desirable that one or more compounds selected from a group consisting of glycerol, 1,5-pentanediol and triethylene glycol be contained in the ink composition as the abovementioned water-soluble organic solvent. In particular, glycerol is especially desirable.

It is desirable that the abovementioned water-soluble organic solvent be contained in the ink composition at the rate of 10 wt % to 35 wt %. By setting this solvent content at 10 wt % or greater, it is possible to obtain both better storability of the recorded images and better discharge reliability of the ink. From the standpoint of improving the storability of the recorded images and discharge reliability of the ink even further, it is desirable that the content of the organic solvent in the ink composition be 15 wt % to 30 wt %.

Examples of carbazide type compounds include carbazide and carbazide derivatives. In concrete terms, these "carbazide type compounds" refer to compounds having a group expressed by the general formula —NYCONHNR$^3$R$^4$, wherein R$^3$ and R$^4$ each independently indicate a hydrogen atom, an alkyl group which may be substituted or an aryl group which may be substituted; Y indicates a hydrogen atom, an alkyl group which may be substituted or an aryl group which may be substituted, which can be obtained by a condensation reaction of the corresponding isocyanates, diisocyanates, urea derivatives or the like with hydrazine compounds expressed by the general formula NH$_2$NR$^3$R$^4$ wherein R$^3$ and R$^4$ each independently indicate a hydrogen atom, an alkyl group which may be substituted or an aryl group which may be substituted.

Furthermore, it is desirable that compounds that are expressed by the general formula R$^1$R$^2$NCONHNR$^3$R$^4$, wherein R$^1$ through R$^4$ each independently indicates a hydrogen atom, an alkyl group which may be substituted, or an aryl group which may be substituted or compounds that are expressed by the general formula R$^5$R$^6$NNHCONHNR$^7$R$^8$, wherein R$^5$ through R$^8$ each independently indicate a hydrogen atom, an alkyl group which may be substituted, or an aryl group which may be substituted be used as the abovementioned carbazide type compounds.

The carbazide type compounds of the present invention may be compounds that have two or more carbazide structures in the same molecule, as represented by the following general formula:

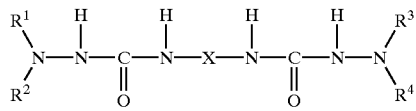

In the above formula, R$^1$ through R$^4$ each independently indicate a hydrogen atom, an alkyl group which may be substituted, or an aryl group which may be substituted; furthermore, X indicates a linear hydrocarbon group which preferably has 1 to 12 carbon atoms, and which even more preferably has 1 to 8 carbon atoms.

If the compound used has two or more carbazide structures in the same molecule as indicated by the above general formula, an especially good effect in terms of improving the gas resistance is obtained.

Concrete examples of the carbazide compounds of the present invention are shown below.

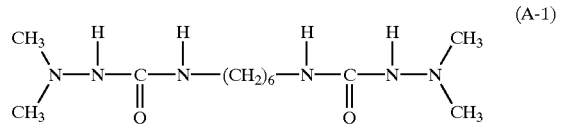
(A-1)

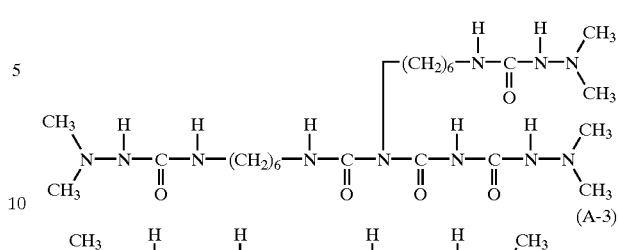
(A-2)

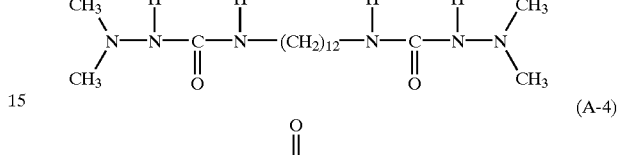
(A-3)

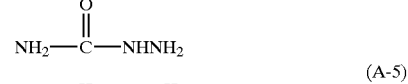
(A-4)

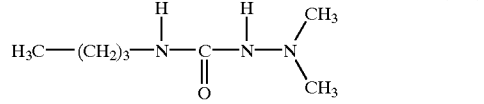
(A-5)

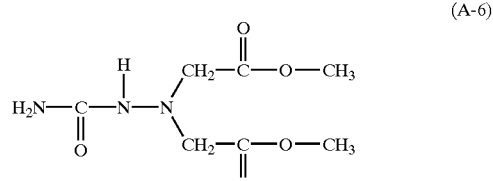
(A-6)

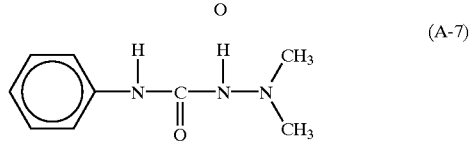
(A-7)

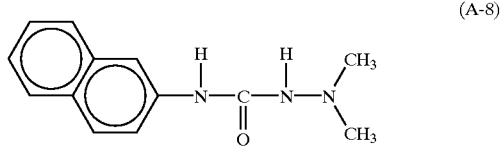
(A-8)

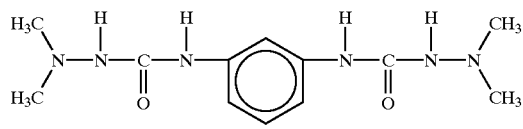
(A-9)

Examples of hydrazide compounds include hydrazide and hydrazide derivatives. In concrete terms, these "hydrazide type compounds" refer to compounds having a group expressed by the general formula —CONHNR$^{10}$R$^{11}$ (R$^{10}$ and R$^{11}$ each independently indicate a hydrogen atom, an alkyl group which may be substituted, or an aryl group which may be substituted), which can be obtained by a condensation reaction of an ester of the corresponding carboxylic acid, an acid derivative such as an acid halide, an acid anhydride or the like, with a hydrazine compound expressed by the general formula NH$_2$NR$^{10}$R$^{11}$ (R$^{10}$ and R$^{11}$ each independently indicate a hydrogen atom, an alkyl group which may be substituted, or an aryl group which may be substituted).

More concretely, it is desirable to used compounds expressed by the general formula R$^9$CONHNR$^{10}$R$^{11}$ (R$^9$ and R$^{11}$ each independently indicate a hydrogen atom, an alkyl group which may be substituted, or an aryl group which may be substituted).

The hydrazide compounds of the present invention may also be compounds that have two or more hydrazide structures in the same molecule, as represented by the following general formula:

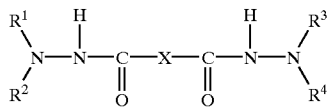

(In the above formula, $R^1$ through $R^4$ each independently indicate a hydrogen atom, an alkyl group which may be substituted, or an aryl group which may be substituted; furthermore, X indicates a linear hydrocarbon group which preferably has 1 to 12 carbon atoms, and which more preferably has 1 to 8 carbon atoms.)

If the compound used has two or more hydrazide structures in the same molecule as indicated by the above general formula, an especially good effect in terms of improving the gas resistance is obtained.

A concrete example of the hydrazide type compound of the present invention is shown below.

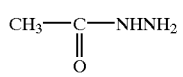
(C-1)

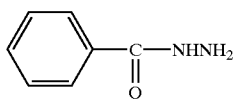
(C-2)

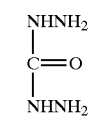
(C-3)

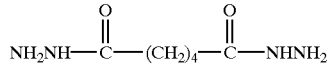
(C-4)

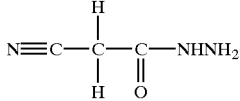
(C-5)

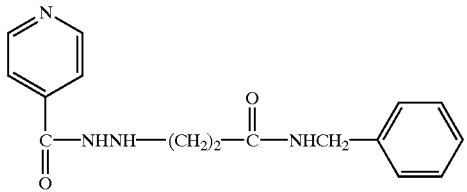
(C-6)

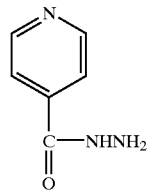
(C-7)

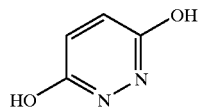
(C-8)

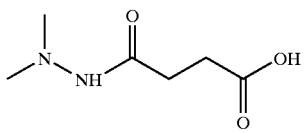
(C-9)

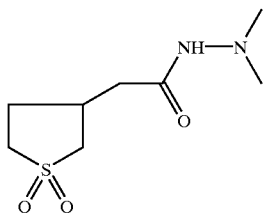
(C-10)

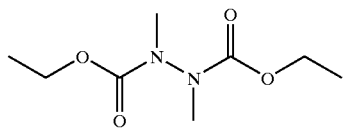
(C-11)

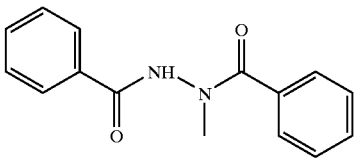
(C-12)

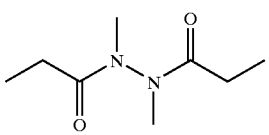
(C-13)

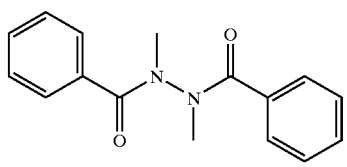
(C-14)

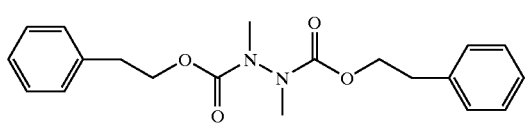
(C-15)

In the present invention, one or more carbazide type compounds may be added to the ink composition singly or in a mixture, and one or more hydrazide type compounds may be added to the ink composition singly or in a mixture. Alternatively, both carbazide type compounds and hydrazide type compounds may be appropriately mixed and added.

It is desirable that the abovementioned carbazide type compounds be contained in the ink composition at the rate of 0.1 wt % to 10 wt %, and a carbazide type compound content of 0.5 wt % to 5 wt % is even more desirable. By using such a desirable content, it is possible to improve the gas resistance of the recorded images while ensuring the reliability characteristics, i.e., discharge stability and resistance to clogging, that are required in an ink composition used for ink jet recording.

It is desirable that the abovementioned hydrazide type compounds be contained in the ink composition at the rate of 0.1 wt % to 10 wt %, and a hydrazide type compound content of 0.5 wt % to 5 wt % is even more desirable. By using such a desirable content, it is possible to improve the gas resistance of the recorded images while ensuring the reliability characteristics, i.e., discharge stability and resistance to clogging, that are required in an ink composition used for ink jet recording.

In cases where the ink composition contains both carbazide type compounds and hydrazide type compounds, there are no particular restrictions of the ratio of the contents of the two types of compounds; however, it is desirable that the total content of both types of compounds be in the range of 0.1 wt % to 10 wt %, and a total content in the range of 0.5 wt % to 5 wt % is even more desirable.

It is desirable that the weight ratio of the content of the abovementioned carbazide type compounds and/or hydrazide type compounds to the content of the abovementioned organic solvent be in the range of 1:3 to 1:100, and a content ratio in the range of 1:10 to 1:80 is even more desirable. In cases where two or more carbazide type compounds and/or hydrazide type compounds are mixed and added, it is desirable that the weight ratio of the total content of these compounds to the content of the abovementioned organic solvent be in the abovementioned specified range.

Furthermore, the ink composition of the present invention may also contain one or more compounds having the following structure (A) as the abovementioned carbazide type compounds and/or hydrazide type compounds.

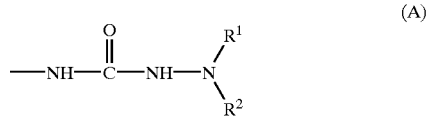
(A)

(In this structure (A), $R^1$ and $R^2$ each independently indicate an alkyl group which may be substituted, or an aryl group which may be substituted.)

In compounds having the abovementioned structure (A), it is desirable that $R^1$ and $R^2$ be methyl groups.

In compounds having the abovementioned structure (A), more or less the same effect is obtained with respect to gas resistance even if $R^1$ and $R^2$ are H. However, in cases where these groups are H, the groups show a particular tendency to react with various types of organic materials, and may sometimes react with constituent parts of the recording apparatus or ink composition supplying medium (ink tank), so that the function of improving the storability is lost, and so that there may in some cases be damage to the recording apparatus or the like. Furthermore, compared to cases where these groups are alkyl groups or aryl groups, the solubility in organic solvents is somewhat poorer. In the case of alkyl groups or aryl groups, the material resistance is moderate, and solubility with respect to organic solvents is easily obtained; however, in cases where the groups are too large, solubility with respect to water is lost. In the case of ink compositions used in ink jet recording, the water content in the ink discharge ports (nozzle parts) gradually evaporates if the apparatus is allowed to stand for a long period of time without being used, so that the organic solvent that is used to prevent clogging becomes the main constituent component. Accordingly, it is necessary that components belonging to additives and the like have both solubility in water and solubility in organic solvents. For this reason, it is preferable that $R^1$ and $R^2$ in the compounds having the abovementioned structure (A) be alkyl groups or aryl groups with a relatively small molecular structure, and it is most preferable that these groups be methyl groups.

The "compounds having the abovementioned structure (A)" refer to compounds having an $-NHCONHNR^1R^2$ group ($R^1$ and $R^2$ each independently indicate a hydrogen atom, an alkyl group which may be substituted, or an aryl group which may be substituted), which can be obtained by a condensation reaction of the corresponding isocyanates, diisocyanates, urea derivatives or the like with hydrazine compounds expressed by the general formula $NH_2NR^1R^2$ ($R^1$ and $R^2$ each independently indicate a hydrogen atom, an alkyl group which may be substituted, or an aryl group which may be substituted).

It is even more desirable that the compounds having the abovementioned structure (A) be compounds that have two or more structures (A) in the same molecule. Examples of compounds that have two or more structures (A) in the same molecule include compounds expressed by the following general formula:

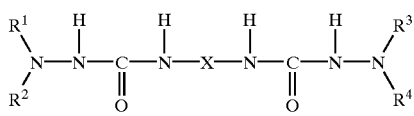

(In the above formula, $R^1$ through $R^4$ each indicate an alkyl group which may be substituted or an aryl group which may be substituted; these groups are preferably methyl groups. Furthermore, X indicates a linear hydrocarbon group which preferably has 1 to 12 carbon atoms, and which even more preferably has 1 to 8 carbon atoms.)

Concrete examples of compounds having the structure (A) are shown below.

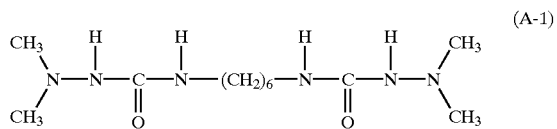
(A-1)

(A-2)

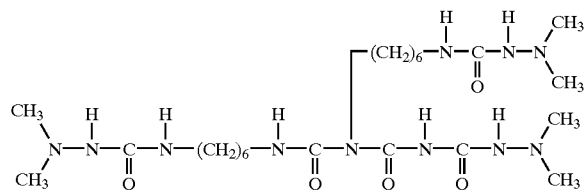

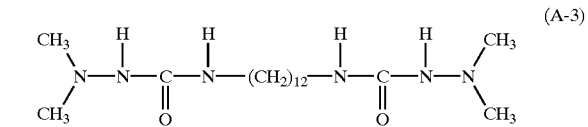
(A-3)

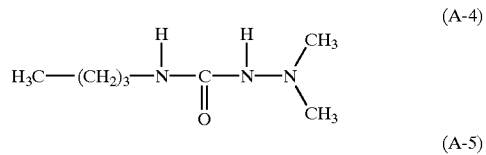
(A-4)

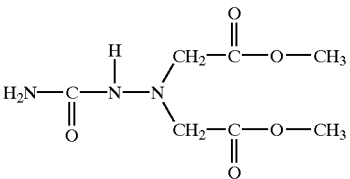
(A-5)

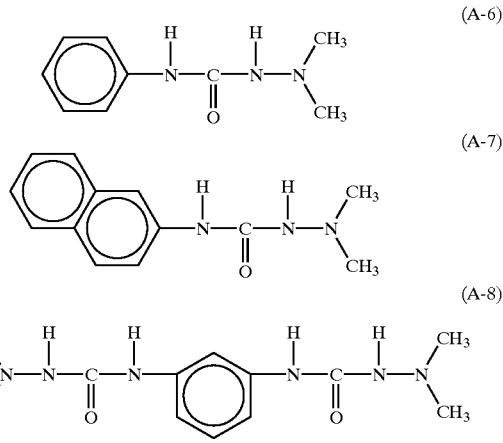

It is desirable that the compounds having the abovementioned structure (A) be contained in the ink composition at the rate of 0.1 wt % to 10 wt %, and a content in the range of 0.5 wt % 5 wt % is even more desirable. By using such a desirable content, it is possible to improve the gas resistance of the recorded images while ensuring the reliability characteristics, i.e., discharge stability and resistance to clogging, that are required in an ink composition used for ink jet recording.

It is desirable that the abovementioned ink composition contain one or more water-soluble organic solvents which are liquids at least in the temperature range of 0 to 40° C., and in which the solubility with respect to water at 20° C. is 1 wt % or greater, and the saturation vapor pressure at a temperature of 20° C. is 1.7 Pa or less, preferably 1 Pa or less.

A number of common methods may be used to measure the saturation vapor pressure; however, in the case of a low-volatility solvent such as the abovementioned organic solvent used in the present invention, more accurate measurements can be accomplished by using the transpiration method (gas flow-through method).

It is desirable that one or more compounds selected from a group consisting of glycerol, 1,5-pentanediol and triethylene glycol be contained [in the ink composition] as the abovementioned water-soluble organic solvent. In particular, glycerol is especially desirable.

It is desirable that the abovementioned water-soluble organic solvent be contained in the ink composition at the rate of 10 wt % to 35 wt %. By setting this solvent content at 10 wt % or greater, it is possible to obtain both better storability of the recorded images and better discharge reliability of the ink. From the standpoint of improving the storability of the recorded images and discharge reliability of the ink even further, it is desirable that the content of the organic solvent in the ink composition be 15 wt % to 30 wt %.

Furthermore, it is desirable that the weight ratio of the content of the compounds having the structure (A) to the content of the abovementioned organic solvent be in the range of 1:3 to 1:100, and a content ratio in the range of 1:10 to 1:80 is even more desirable.

The ink composition of the present invention containing the abovementioned organic solvent with the abovementioned characteristics is superior in terms of discharge reliability and printing quality, without causing any deterioration in the superior gas resistance imparted by means of the compounds having the structure (A). In particular, in cases where this ink composition is used as an ink jet recording ink, drying of the ink in the nozzle can be prevented, so that clogging of the nozzle can be securely prevented.

It is desirable that water-soluble dyes be used as coloring agents; concrete examples of such dyes include dyes classified as acid dyes, direct dyes, catalyst dyes, reactive dyes, soluble vat dyes, sulfide dyes, edible dyes and the like in the Color Index. Furthermore, many dyes that are not described in the Color Index are also suitable for use.

In cases where the coloring agents used are dyes consisting of metal complexes, and especially dyes consisting of copper complexes, or in cases where the coloring agents used are dyes that can be expressed by general formula (B), recorded images that have a high image quality and a superior gas resistance can be obtained.

Concrete examples of suitable coloring agents include C. I. Direct Black 17, 19, 32, 38, 51, 62, 71, 74, 75, 112, 117, 154, 163 and 168, C. I. Acid Black 7, 24, 26, 48, 52, 58, 60, 107, 109, 118, 119, 131, 140, 155, 156 and 187, C. I. Food Black 1 and 2, C. I. Reactive Black 5, C. I. Direct Yellow 11, 28, 33, 39, 44, 58, 86, 100, 132, 142 and 330, C. I. Acid Yellow 3, 19, 23, 25, 29, 38, 49, 59, 62 and 72, C. I. Basic Yellow 11 and 51, C. I. Disperse Yellow 3 and 5, C. I. Reactive Yellow 2, C. I. Direct Red 23, 79, 80, 83, 99, 220, 224 and 227, C. I. Direct Red 1, 8, 17, 18, 32, 35, 37, 42, 52, 57, 92, 115, 119, 131, 133, 134, 154, 186, 249, 254 and 256, C. I. Basic Red 14 and 39, C. I. Disperse Red 60, C. I. Direct Blue 6, 8, 15, 25, 71, 76, 80, 86, 90, 106, 108, 123, 163, 165, 168, 199 and 226, C. I. Acid Blue 9, 29, 40, 62, 74, 102, 104, 113, 117, 120, 175 and 183, C. I. Basic Blue 41, C. I. Reactive Blue 15, C.I. Direct Violet 47, 51, 90 and 94, C. I. Acid Violet 11, 34 and 75, dyes expressed by the abovementioned general formula (B), and the like.

It is desirable that the coloring agent content in the ink composition be in the range of 0.1 wt % to 20 wt %, and a coloring agent content in the range of 0.5 wt % to 10 wt % is even more desirable.

In particular, an ink composition which contains dyes such as copper phthalocyanine dyes or the like, or dyes expressed by general formula (B), and which also contains carbazide type compounds and/or hydrazide type compounds expressed by the abovementioned general formulae, is effective in improving the gas resistance of recorded images in cases where recording is performed on various types of recording media used in ink jet recording (photographic paper, matte paper and the like).

In the ink composition of the present invention, water is used as the main solvent. Either pure water such as ion exchange water, ultra-filtered water, reverse-osmosis water, distilled water or the like, or ultra-pure water, may be used as the abovementioned water. In particular, the use of water that has been sterilized by irradiation with ultraviolet light or the addition of hydrogen peroxide or the like is desirable from the standpoint of preventing the growth of mold and bacteria so that long-term storage of the ink is possible.

It is desirable that the content of the abovementioned water in the ink composition of the present invention be in the range of 40 wt % to 90 wt %, and a water content in the range of 55 wt % to 80 wt % is even more desirable.

The abovementioned ink composition may also contain one or more acetylene glycol type compounds. By using acetylene glycol type compounds, it is possible to achieve a further increase in the discharge stability of the ink without causing any deterioration in the gas resistance. It appears that the reason for this increase in the discharge stability of the ink is that acetylene glycol type compounds lower the surface tension of the ink composition, and thus promote the permeation of the ink into the recording medium.

Commercially marketed products such as Olfine STG (commercial name of a product made by Nissin Chemical Industry Co., Ltd.), Surfinol 104 (commercial name of a product made by Air Products and Chemicals, Inc.), Olfine E1010 (commercial name of a product made by Nissin Chemical Industry Co., Ltd.) and the like can be used as acetylene glycol type compounds. It is desirable that the content of acetylene glycol type compounds be 1 wt % to 3 wt % of the total ink composition. If the content is in this range, both gas resistance of the recorded images and ink discharge stability can be obtained in a desirable manner.

The abovementioned ink composition may also contain one or more glycol ether type compounds. By including glycol ether type compounds in the ink composition as permeation-promoting agents, it is possible to increase the image quality of the recorded images without causing any deterioration in the gas resistance of the recorded images.

Examples of glycol ether type compounds include diethylene glycol monobutyl ether, triethylene glycol monobutyl ether, propylene glycol monomethyl ether, diethylene glycol monoethyl ether, diethylene glycol monomethyl ether and the like. These compounds may be used singly or in mixtures.

The content of glycol ether type compounds in the ink composition of the present invention is preferably 3 wt % to 20 wt %, and is even more preferably 5 wt % to 15 wt %.

By using glycol ether type compounds as solvents, it is possible to increase the discharge stability of the ink without causing any deterioration in the gas resistance of the recorded images.

The abovementioned ink composition may also contain one or more humectants consisting of tertiary amines. By using humectants consisting of tertiary amines in combination with the abovementioned humectants, it is possible to achieve a further increase in discharge stability.

Examples of tertiary amines include trimethylamine, triethylamine, triethanolamine, dimethylethanolamine, diethylethanolamine, triisopropanolamine, butyldiethanolamine and the like. These compounds may be used singly or in mixtures. The amount of such tertiary amine(s) that is added to the ink composition is preferably about 0.1 to 10 wt %, and is even more preferably 0.5 to 5 wt %.

Furthermore, the compounds cited as concrete examples of the abovementioned acetylene glycol ether type compounds, glycol ether type compounds and tertiary amines include compounds whose saturation vapor pressure at 20° C. is 1.7 Pa or less; such compounds are concrete examples of the specified organic solvent of the present invention, and also function at the same time as acetylene glycol ether type compound additives, glycol ether type compound additives or tertiary amine additives.

If necessary, the ink composition of the present invention may also include assistants that are commonly used in ink jet recording inks. Examples of such assistants include additives such as preservatives, anti-mold agents, pH adjusting agents, dissolution assistants, oxidation inhibitors, ultraviolet absorbing agents, chelating agents, anti-rust agents, surface tension adjusting agents, dielectric constant adjusting agents and the like.

It is desirable that the viscosity of the ink composition of the present invention be less than 5 mPa·s at a temperature of 20° C.

Examples of the abovementioned preservatives and anti-mold agents that can be added to the ink composition of the present invention include sodium benzoate, pentachlorophenol sodium, sodium 2-pyridinethiol-1-oxide, sodium sorbate, sodium dehydroacetate, 1,2-dibenzisothiazolin-3-one (Proxel CRL, Proxel BDN, Proxel GXL, Proxel XL-2 and Proxel TN made by AVECIA Co., Ltd.) and the like. One or more of these compounds may be used.

Furthermore, examples of the abovementioned pH adjusting agents and dissolution assistants that can be added to the ink composition of the present invention include amines such as diethanolamine, triethanolamine, propanolamine, morpholine and the like, modified products of such amines, inorganic salts such as potassium hydroxide, sodium hydroxide, lithium hydroxide and the like, ammonium hydroxide, quaternary ammonium hydroxides of tetramethylammonium and the like), carbonates such as potassium carbonate, sodium carbonate, lithium carbonate and the like, as well as phosphates and the like, 2-pyrrolidone, N-methyl-2-pyrrolidone, ureas such as urea, thiourea, tetramethylurea and the like, allophanates such as allophanates, methylallophanates and the like, biurets such as biuret, dimethylbiuret, tetramethylbiuret and the like, and L-ascorbic acid and salts of the same. One or more of these compounds may be used.

Examples of the abovementioned oxidation inhibitors include hindered phenol compounds, amine compounds, phosphorus compounds, sulfur compounds and the like.

Examples of the abovementioned ultraviolet absorbing agents include benzophenone type compounds, salicylate type compounds, benzotriazole type compounds, cyanoacrylate type compounds, and metal oxides such as titanium oxide, zinc oxide, selenium oxide, cerium oxide and the like. Examples of the abovementioned quenching agent include nickel salts such as nickel dibutyldithiocarbamate, nickel sulfate, nickel oxalate and the like, metal halides such as potassium iodide, sodium iodide, potassium bromide, sodium bromide, potassium chloride and the like, and other compounds such as potassium thiocyanate, cobalt sulfate, copper sulfate, ferrous sulfate and the like.

By using the abovementioned construction, it is possible to improve the gas resistance of the recorded images.

In the present invention, the abovementioned carbazide type compounds and/or hydrazide type compounds also act effectively when applied to the recording medium as application liquids separately from or in addition to the ink composition.

Furthermore, in the present invention, compounds having the abovementioned structure (A) also act effectively when applied to the recording medium as application liquids separately from or in addition to the ink composition. In this case, except of the coloring agents, it is desirable that application liquids be prepared in ranges similar to those of the construction of the abovementioned ink composition.

Next, the ink jet recording method of the present invention will be described. In the ink jet recording method of the present invention, by performing ink jet recording using the abovementioned ink composition, it is possible to perform recording without any clogging of the ink; furthermore, carbazide type compounds and/or hydrazide type compounds can be caused to be present in appropriate amounts in the recorded matter, so that recorded matter that has a superior gas resistance can be obtained.

In another ink jet recording method of the present invention, compounds having the abovementioned structure (A) can be caused to be present in appropriate amounts in the recorded matter by performing ink jet recording using the abovementioned ink composition; as a result, recorded matter that has a superior gas resistance can be obtained.

EXAMPLES

Next, the present invention will be described more concretely in terms of examples. However, the present invention is not limited in any way by these examples.

Examples 1~10

(Preparation of Ink Compositions)

Respective components having the compositions shown in Table 1 were agitated for 30 minutes at ordinary temperature, and were then filtered through a 1 μm membrane filter, thus producing respective ink compositions.

TABLE 1

|  |  | saturation vapor pressure *1 | Example | | | | | | | | | | Comparative Example | | |
|---|---|---|---|---|---|---|---|---|---|---|---|---|---|---|---|
|  |  |  | 1 | 2 | 3 | 4 | 5 | 6 | 7 | 8 | 9 | 10 | 1 | 2 | 3 |
| Coloring agent | C. I. Direct Blue 199 | Solid | 3 |  |  |  |  |  |  |  |  |  | 3 |  |  |
|  | C. I. Direct Blue 86 | Solid |  | 2 | 2 | 2 |  |  |  |  |  |  |  | 2 | 2 |
|  | Dye expressed by formula (B-4) | Solid |  |  |  |  | 3 | 3 | 2.5 | 2.5 | 2.5 |  |  |  |  |
|  | C. I. Acid Red 52 | Solid |  |  |  |  |  |  |  |  |  | 2.5 |  |  |  |
| Organic | Glycerol | Less than 0.1 Pa | 14 |  |  |  |  |  | 10 | 10 | 10 | 10 | 14 |  |  |
|  | Triethylene glycol | Less than 1 Pa |  | 15 | 10 | 35 |  |  |  |  |  |  |  | 5 | 40 |
|  | 1,5-Pentanediol | Less than 1 Pa |  |  |  |  | 4 | 24 | 13 | 13 | 13 | 13 |  |  |  |
|  | Ethylene glycol | 7 Pa | 10 | 20 | 25 | 5 | 20 | 5 | 3 | 2 | 1 |  | 10 | 30 |  |
|  | Olfine E1010 (made by Nissin Chemical Industry Co., Ltd.) | *2 | 1 |  |  |  |  |  | 1.5 | 1.5 | 1.5 | 1.5 | 1 |  |  |
|  | Surfynol 104 (Air Products and Chemicals Inc.) | Solid |  | 2 | 2 | 2 | 3 | 3 |  |  |  |  |  | 2 | 2 |
|  | Diethylene glycol monobutyl ether | 3 Pa |  | 10 | 10 | 10 |  |  |  |  |  |  |  | 10 | 10 |
|  | Triethylene glycol monobutyl ether | 1 Pa | 10 |  |  |  | 5 | 5 | 10 | 10 | 10 | 10 | 10 |  |  |
|  | Propylene glycol monomethyl ether | 1.2 kPa |  |  |  |  | 5 | 5 |  |  |  |  |  |  |  |
|  | Triethanolamine | 1 Pa |  |  |  |  | 1 | 1 | 0.5 | 0.5 | 0.5 | 0.5 |  |  |  |
| Gas resistance imparting agent | Compound expressed by formula (A-1) | Solid | 2 |  |  |  | 0.1 | 10 |  |  |  |  |  |  |  |
|  | Compound expressed by formula (C-4) | Solid |  | 5 | 5 | 3.5 |  |  | 0.25 | 0.35 | 0.5 | 0.5 |  | 5 | 3.5 |

TABLE 1-continued

|  |  | saturation vapor pressure *1 | Example | | | | | | | | | | Comparative Example | | |
|---|---|---|---|---|---|---|---|---|---|---|---|---|---|---|---|
|  |  |  | 1 | 2 | 3 | 4 | 5 | 6 | 7 | 8 | 9 | 10 | 1 | 2 | 3 |
| Preservative | Proxel XL-2 (made by AVECIA Co., Ltd.) | 1.3 kPa | 0.3 | 0.3 | 0.3 | 0.3 | 0.3 | 0.3 | 0.3 | 0.3 | 0.3 | 0.3 | 0.3 | 0.3 | 0.3 |
| Water |  | 2.4 kPa | Remainder | Remainder | Remainder | Remainder | Remainder | Remainder | Remainder | Remainder | Remainder | Remainder | Remainder | Remainder | Remainder |
| Total amount of organic solvents with a saturation vapor pressure (*1) of 1.7 Pa or less (2) |  |  | 25 | 15 | 10 | 35 | 10 | 30 | 35 | 35 | 35 | 35 | 25 | 5 | 40 |
| Ratio of (1):(2) (with (1) taken as 1) |  |  | 1:12.5 | 1:3 | 1:2 | 1:10 | 1:100 | 1:3 | 1:140 | 1:100 | 1:70 | 1:70 | — | 1:1 | 1:11.4 |

[Notes]
*1: Saturation vapor pressure at 20° C.
*2: No volatility observed at 20° C.
Units: wt %

Next, the abovementioned ink compositions were loaded into the special cartridge of an ink jet printer PM800C (made by Seiko Epson Co., Ltd.), and printing was performed on each of two ink jet recording media-Premium Glossy Photo Paper (PM Photographic Paper) and Matte Paper-Heavyweight (PM Matte Paper); both made by Seiko Epson Co., Ltd.—with the printing duty adjusting so that the OD (optical density) was in the range of 0.9 to 1.1. Then, the evaluation described below was performed.

(Ozone Exposure Test)

Using a constant-flow-rate flow type corrosion test apparatus GH-180 (made by Yamasaki Seiki Kenkyusho Inc.), the recorded matter was exposed for a specified period of time (8 hours, 16 hours or 24 hours) at a temperature of 25° C., a humidity of 60% RH and an ozone concentration of 2 ppm.

(Outdoor Exposure Test)

A structure consisting only of columns and a roof was constructed so that the samples were not exposed to direct sunlight or rain, and so that there was no obstruction of the air flow by walls or obstacles. This structure was installed outdoors; the samples of recorded matter were placed in this structure and exposed for a specified period of time (1.5 months, 3 months or 6 months).

(Evaluation Criteria)

After the abovementioned exposure tests were performed, the OD values of the respective samples of recorded matter were measured using a reflective density meter ("SPM-100" made by Gretag Co., Ltd.), and the relict optical density (ROD) was determined using the following equation:

$$ROD(\%) = (D/D_0) \times 100$$

(D: OD after exposure test, $D_0$: OD prior to exposure test) Then, the samples were evaluated according to the following judgement criteria on the basis of the ROD values determined.

A: ROD 90% or greater; good gas resistance.

B: ROD 80% or greater but less than 90%; no problems in terms of practical use.

C: ROD 70% or greater but less than 80%; sufficient for viewing.

D: ROD less than 70%; insufficient for practical use.

(Discharge Reliability Test)

Ink cartridges filled with the respective ink compositions were mounted in the PM-800C; then, following an initial confirmation of normal discharge of the ink, the main body power supply of the PM-800C was switched off, and the ink cartridges were allowed to stand "as is" in a mounted state at a temperature of 40° C. and a relative humidity of 20% RH. After being allowed to stand for a specified period of time, the PM-800C was shifted to an ordinary-temperature environment. The main body power supply was switched on after waiting for the temperature of the main body of the PM-800C to drop to ordinary temperature; then, the ink compositions were discharged, and the discharge conditions were observed visually. A specified cleaning recovery operation for the PM-800C was performed, and the number of times that this cleaning recovery operation had to be repeated before the ink compositions could be discharged in a normal manner was investigated. Then, an evaluation was performed using the following evaluation criteria.

(Evaluation Criteria)

A: Normal discharge after no cleaning recovery operation or a single cleaning recovery operation.

B: Normal discharge after the cleaning recovery operation was performed two or three times.

C: Normal discharge after the cleaning recovery operation was performed four to six times.

NG: No normal discharge even after the cleaning recovery operation was performed six times.

The results of the evaluation performed using the abovementioned evaluation criteria are shown in Table 2.

TABLE 2

|  |  |  | Example | | | | | | | | | | Comparative Example | | |
|---|---|---|---|---|---|---|---|---|---|---|---|---|---|---|---|
|  |  |  | 1 | 2 | 3 | 4 | 5 | 6 | 7 | 8 | 9 | 10 | 1 | 2 | 3 |
| Ozone exposure test | PM Photographic | 8 hours | A | A | A | A | B | A | B | A | A | B | C | A | A |
|  |  | 16 hours | A | A | A | A | C | B | B | B | B | B | NG | A | B |
|  |  | 24 hours | B | B | B | B | C | B | C | B | B | C | NG | B | C |
|  | PM Matte Paper | 8 hours | A | A | A | A | B | A | A | A | A | B | B | A | B |
|  |  | 16 hours | B | A | A | B | B | A | B | B | A | B | C | A | C |
|  |  | 24 hours | B | B | B | C | C | B | B | B | B | C | NG | B | NG |
| Outdoor exposure test | PM Photographic Paper | 1.5 months | A | A | A | A | B | A | B | A | A | B | C | A | A |
|  |  | 3 months | A | A | A | A | C | B | B | B | B | C | NG | A | B |
|  |  | 6 months | B | B | B | B | C | B | C | C | B | C | NG | B | C |
|  | PM Matte Paper | 1.5 months | A | A | A | A | B | A | B | B | A | B | C | A | B |
|  |  | 3 months | B | B | B | B | B | B | B | B | B | C | C | B | C |
|  |  | 6 months | B | B | B | C | C | B | C | C | B | C | NG | B | NG |
| Discharge reliability test |  | 1 month | A | B | B | A | A | B | A | A | A | A | A | B | A |
|  |  | 2 months | A | B | B | B | B | B | A | A | A | A | A | C | A |
|  |  | 4 months | B | B | C | B | B | B | A | A | A | A | B | NG | B |

As is seen from Table 2, the recorded images produced using the ink compositions of Examples 1 through 10 were all superior in terms of gas resistance; furthermore, the ink compositions of Examples 1 through 10 were superior in terms of discharge reliability. In the case of Comparative Examples 1 through 3, on the other hand, it is seen that neither the gas resistance of the recorded images nor the discharge reliability of the ink compositions reached sufficient levels for practical use (C or better).

Examples 11~20

(Preparation of Ink Compositions)

Respective components having the compositions shown in Table 3 were agitated for 30 minutes at ordinary temperature, and were then filtered via a 1 μm membrane filter, thus producing respective ink compositions.

TABLE 3

|  |  | Saturation vapor pressure *1 | Example | | | | | | | | | | Comparative Example |
|---|---|---|---|---|---|---|---|---|---|---|---|---|---|
|  |  |  | 11 | 12 | 13 | 14 | 15 | 16 | 17 | 18 | 19 | 20 | 4 |
| Coloring agent | C. I. Direct Blue 199 | Solid | 3 |  |  |  |  |  |  |  |  |  | 3 |
|  | C. I. Direct Blue 86 | Solid |  | 2 | 2 | 2 |  |  |  |  |  |  |  |
|  | Dye expressed by formula (B-4) | Solid |  |  |  |  | 3 | 3 | 2.5 | 2.5 | 2.5 |  |  |
|  | C. I. Acid Red 52 | Solid |  |  |  |  |  |  |  |  |  | 2.5 |  |
| Organic | Glycerol | Less than 0.1 Pa | 14 |  |  |  |  |  | 9 | 9 | 9 | 9 | 14 |
|  | Triethylene glycol | Less than 1 Pa |  | 13 | 8 | 33 |  |  | 14 | 14 | 14 | 14 |  |
|  | 1,5-Pentanediol | Less than 1 Pa |  |  |  |  | 4 | 24 |  |  |  |  |  |

TABLE 3-continued

|  |  | Saturation vapor pressure *1 | Example | | | | | | | | | | Comparative Example |
|---|---|---|---|---|---|---|---|---|---|---|---|---|---|
|  |  |  | 11 | 12 | 13 | 14 | 15 | 16 | 17 | 18 | 19 | 20 | 4 |
|  | Ethylene glycol | 7 Pa | 10 | 10 | 15 |  | 20 | 5 | 1 | 0.5 |  |  | 10 |
|  | Olfine E1010 (made by Nissin Chemical Industry Co., Ltd.) | *2 | 1 | 2 | 2 | 2 |  |  |  |  |  |  | 1 |
|  | Surfinol 104 (Air Products and Chemicals Inc.) | Solid |  |  |  |  | 3 | 3 | 1 | 1 | 1 | 1 |  |
|  | Diethylene glycol monobutyl ether | 3 Pa |  | 10 | 10 | 10 |  |  |  |  |  |  |  |
|  | Triethylene glycol monobutyl ether | 1 Pa | 10 |  |  |  | 5 | 5 | 12 | 12 | 12 | 12 | 10 |
|  | Propylene glycol monomethyl ether | 1.2 kPa |  |  |  |  | 5 | 5 |  |  |  |  |  |
|  | Tri-ethanolamine | 1 Pa |  |  |  |  | 1 | 1 |  |  |  |  |  |
| Gas resistance | Compound expressed by formula (A-1) | Solid | 2 |  |  |  | 0.1 | 10 |  |  |  |  |  |
|  | Compound expressed by formula (A-2) | Solid |  | 5 | 5 | 3.5 |  |  | 0.25 | 0.35 | 0.5 | 0.5 |  |
| Preservative | Proxel XL-2 (made by AVECIA Co.) | 1.3 kPa | 0.3 | 0.3 | 0.3 | 0.3 | 0.3 | 0.3 | 0.3 | 0.3 | 0.3 | 0.3 | 0.3 |
| Water |  | 2.4 kPa | Remainder | Remainder | Remainder | Remainder | Remainder | Remainder | Remainder | Remainder | Remainder | Remainder | Remainder |
| Total amount of organic solvents with a saturation vapor pressure (*1) of 1.7 Pa or less (2) |  |  | 25 | 15 | 10 | 35 | 10 | 30 | 35 | 35 | 35 | 35 | 25 |
| Ratio of (1):(2) (with (1) taken as 1) |  |  | 1:12.5 | 1:3 | 1:2 | 1:10 | 1:100 | 1:3 | 1:140 | 1:100 | 1:70 | 1:70 | — |

[Notes]
*1: Saturation vapor pressure at 20° C.
*2: No volatility observed at 20° C.
Units: wt %

Next, printing was performed in the same manner as in the abovementioned examples using the abovementioned ink compositions, and an evaluation was performed by the same evaluation method as that described above.

The results of the evaluation performed using the abovementioned evaluation criteria are shown in Table 4.

TABLE 4

|  |  |  | Example | | | | | | | | | | Comparative Example |
|---|---|---|---|---|---|---|---|---|---|---|---|---|---|
|  |  |  | 11 | 12 | 13 | 14 | 15 | 16 | 17 | 18 | 19 | 20 | 4 |
| Ozone exposure test | PM Photographic | 8 hours | A | A | A | A | B | A | B | A | A | B | C |
|  |  | 16 hours | A | A | A | B | C | B | B | B | B | C | NG |

TABLE 4-continued

|  |  |  | Example | | | | | | | | | | Comparative Example |
|---|---|---|---|---|---|---|---|---|---|---|---|---|---|
|  |  |  | 11 | 12 | 13 | 14 | 15 | 16 | 17 | 18 | 19 | 20 | 4 |
|  |  | 24 hours | B | B | B | B | C | B | C | B | B | C | NG |
|  | PM Matte Paper | 8 hours | A | A | A | A | B | A | B | A | A | B | B |
|  |  | 16 hours | B | B | B | B | B | A | B | B | B | B | C |
|  |  | 24 hours | B | B | B | C | C | B | C | C | B | C | NG |
| Outdoor exposure test | PM Photographic | 1.5 months | A | A | A | A | B | A | B | A | A | B | C |
|  |  | 3 months | A | A | A | B | C | B | B | B | B | C | NG |
|  |  | 6 months | B | B | B | B | C | B | C | C | B | C | NG |
|  | PM Matte Paper | 1.5 months | A | A | A | A | B | A | B | B | A | B | C |
|  |  | 3 months | B | B | B | B | B | B | B | B | B | C | C |
|  |  | 6 months | B | B | B | C | C | B | C | C | B | C | NG |
| Discharge reliability test |  | 1 month | A | B | B | B | A | B | A | A | A | A | A |
|  |  | 2 months | A | B | B | B | B | B | A | A | A | A | A |
|  |  | 4 months | B | B | C | B | B | B | A | B | B | B | B |

As is seen from Table 4, the recorded images of Examples 11 through 20 in which ink compositions containing compounds having the abovementioned structure (A) were used were all superior in terms of gas resistance and discharge reliability. In the case of Comparative Example 4, on the other hand, neither the gas resistance of the recorded images nor the discharge stability of the ink composition reached levels that were sufficient for practical use (C or better).

By using the ink composition and ink jet recording method of the present invention, it is possible to obtain high-quality images which are superior in terms of the discharge stability of the ink, and which are superior in terms of the gas resistance of the recorded images.

Furthermore, the recorded matter of the present invention is superior in terms of the gas resistance of the recorded images.

What is claimed is:

1. An ink composition which contains a coloring agent, water, a water-soluble organic solvent and one or more carbazide type compounds, wherein said organic solvent is a liquid at least in the temperature range of 0 to 40° C., and has a solubility of 1 wt % or greater with respect to water at a temperature of 20° C., and a saturation vapor pressure of 1.7 Pa or less at a temperature of 20° C., and said organic solvent is contained in the ink composition at the rate of at least 10 wt % and no greater than 35 wt %, and wherein said carbazide type compounds are compounds that are expressed by the general formula $R^1R^2NCONHNR^3R^4$, wherein $R^1$ through $R^4$ each independently indicates a hydrogen atom, an alkyl group which may be substituted or an aryl group which may be substituted, or compounds that are expressed by the general formula $R^5R^6NNHCONHNR^7R^8$, wherein $R^5$ through $R^8$ each independently indicates a hydrogen atom, an alkyl group which may be substituted or an aryl group which may be substituted.

2. The ink composition according to claim 1, which contains one or more solvents selected from a group consisting of glycerol, 1,5-pentanediol and triethylene glycol as said organic solvent.

3. The ink composition according to claim 1, wherein said carbazide type compounds are compounds that have two or more carbazide structures in the same molecule.

4. The ink composition according to claim 1, wherein said carbazide type compounds are contained in the ink composition in an amount of 0.1 wt % to 10 wt %.

5. The ink composition according to claim 4, wherein said carbazide type compounds are contained in the ink composition in an amount of at least 0.5 wt % and no greater than 5 wt %.

6. The ink composition according to claim 1, wherein the weight ratio of the content of said carbazide type compounds to the content of said organic solvent is in the range of 1:3 to 1:100.

7. The ink composition according to claim 1, which contains a dye consisting of a metal complex as said coloring agent.

8. The ink composition according to claim 7, which contains a dye consisting of a copper complex.

9. The ink composition according to claim 8, which contains a copper phthalocyanine dye.

10. The ink composition according to claim 1, which contains a dye expressed by the following general formula (B):

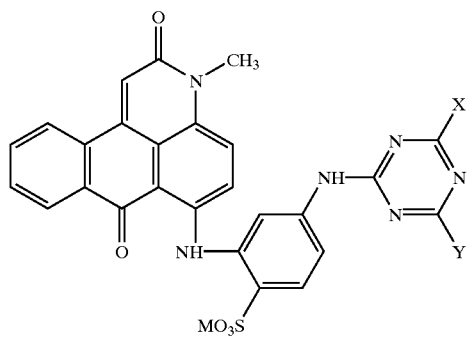

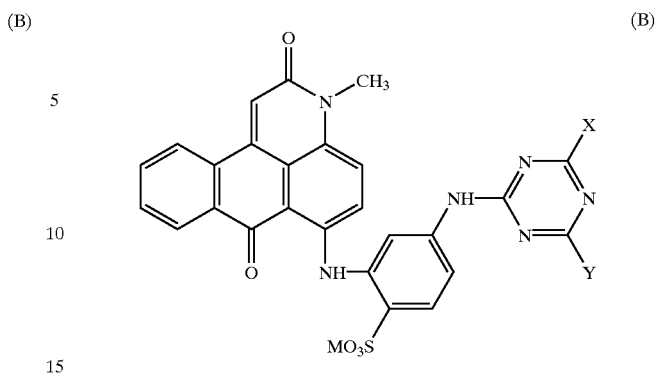

where X indicates an aniline group that is substituted by at least one SO³M, Y indicates OH, Cl or a morpholino group, and M indicates H, Li, Na, K, ammonium or an organic amine.

11. The ink composition according to claim 1, which further contains one or more acetylene glycol type compounds.

12. The ink composition according to claim 1, which further contains one or more glycol ether type compounds.

13. The ink composition according to claim 1, which further contains one or more humectants consisting of tertiary amines.

14. An ink jet recording method which performs recording by discharging liquid droplets of an ink composition and causing these liquid droplets to adhere to a recording medium, wherein the ink composition according to claim 1 is used as said ink composition.

15. Recorded matter which is recorded by the ink jet recording method according to claim 14.

16. An ink composition which contains a coloring agent, water, a water-soluble organic solvent and one or more hydrazide type compounds, wherein said organic solvent is a liquid at least in the temperature range of 0 to 40° C., and has a solubility of 1 wt % or greater with respect to water at a temperature of 20° C., and a saturation vapor pressure of 1.7 Pa or less at a temperature of 20° C., and said organic solvent is contained in the ink composition at the rate of at least 10 wt % and no greater than 35 wt %, wherein said hydrazide type compounds are compounds that are expressed by the general formula R⁹CONHNR¹⁰R¹¹, wherein R9 through R¹¹ each independently indicates a hydrogen atom, an alkyl group which may be substituted or an aryl group which may be substituted, and wherein the coloring agent comprises a dye consisting of a metal complex or a dye expressed by the following general formula (B):

where X indicates an anilino group that is substituted by at least one SO³M, Y indicates OH, Cl or a morpholino group, and M indicates H, Li, Na, K, ammonium or an organic amine.

17. The ink composition according to claim 16, which contains one or more solvents selected from the group consisting of glycerol, 1,5-pentanediol and triethylene glycol as said organic solvent.

18. The ink composition according to claim 16, wherein said hydrazide type compounds are compounds that have two or more hydrazide structures in the same molecule.

19. The ink composition according to claim 16, wherein said hydrazide type compounds are contained in the ink composition in the amount of 0.1 wt % to 10 wt %.

20. The ink composition according to claim 19, wherein said hydrazide type compounds are contained in the ink composition in an amount at least 0.5 wt % and no greater than 5 wt %.

21. The ink composition according to claim 16, wherein the weight ratio of the content of said hydrazide type compounds to the content of said organic solvent is in the range of 1:3 to 1:100.

22. The ink composition according to claim 16, which contains a dye consisting of a copper complex.

23. The ink composition according to claim 22, which contains a copper phthalocyanine dye.

24. The ink composition according to claim 16, which further contains one or more acetylene glycol type compounds.

25. The ink composition according to claim 16, which further contains one or more glycol ether type compounds.

26. The ink composition according to claim 16, which further contains one or more humectants consisting of tertiary amines.

27. An ink jet recording method comprising performing recording by discharging liquid droplets of the ink composition of claim 16 and causing these liquid droplets to adhere to a recording medium.

28. Recorded matter which is recorded by the ink jet recording method according to claim 27.

29. The ink composition according to claim 16, wherein the coloring agent comprises the dye expressed by the general formula (B).

30. An ink jet recording method comprising depositing droplets of the ink composition of claim 29 onto a recording medium so as to cause the droplets to adhere to the recording medium.

31. The recording medium recorded by the ink jet recording method of claim 30.

32. The ink composition according to claim 16, wherein the coloring agent comprises the dye consisting of the metal complex.

33. An ink jet recording method comprising depositing droplets of the ink composition of claim 32 onto a recording medium so as to cause the droplets to adhere to the recording medium.

34. The recording medium recorded by the ink jet recording method of claim 33.

* * * * *

(12) EX PARTE REEXAMINATION CERTIFICATE (6549th)
United States Patent
Oki et al.

(10) Number: US 6,761,759 C1
(45) Certificate Issued: Dec. 2, 2008

(54) INK COMPOSITION, INK JET RECORDING METHOD AND RECORDED MATTER

(75) Inventors: Yasuhiro Oki, Nagano-ken (JP); Kazuhiko Kitamura, Nagano-ken (JP); Tetsuya Aoyama, Nagano-ken (JP); Kyoichi Oka, Nagano-ken (JP); Nobuo Uotani, Chiba-ken (JP); Hiroshi Takahashi, Chiba-ken (JP); Yuji Ito, Chiba-ken (JP)

(73) Assignee: Seiko Epson Corporation, Shinjuku-KuTokyo (JP)

Reexamination Request:
No. 90/008,851, Sep. 21, 2007

Reexamination Certificate for:
Patent No.: 6,761,759
Issued: Jul. 13, 2004
Appl. No.: 10/103,657
Filed: Mar. 21, 2002

(30) Foreign Application Priority Data

Mar. 30, 2001 (JP) .................................. 2001-102702
Mar. 30, 2001 (JP) .................................. 2001-102703

(51) Int. Cl.
*C09D 11/00* (2006.01)

(52) U.S. Cl. ............... 106/31.43; 106/31.47; 106/31.49; 106/31.58; 106/31.75; 106/31.86; 347/100

(58) Field of Classification Search ...................... None
See application file for complete search history.

(56) References Cited

U.S. PATENT DOCUMENTS 6,761,759 B2   7/2004   Oki et al.

FOREIGN PATENT DOCUMENTS

JP          7-314882        5/1995

OTHER PUBLICATIONS

Patent Abstracts of Japan Publication No.: 07–314882, dated May 12, 1995.

*Primary Examiner*—Dwayne C Jones

(57) ABSTRACT

The ink composition of the present invention contains a coloring agent, water, a water-soluble organic solvent which is a liquid at least at temperatures of 40° C. or less, and which has a solubility of 1 wt % or greater with respect to water at a temperature of 20° C., and a saturation vapor pressure of 1.7 Pa or less at a temperature of 20° C. (with said organic solvent being contained in the ink composition at the rate of 10 to 35 wt %), and one or more amidine type compounds. As a result, the present invention provides an ink composition, a recording medium, recorded matter and an ink jet recording method that make it possible to obtain images with a high image quality which are superior in terms of the gas resistance of the recorded matter.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–34 is confirmed.

\* \* \* \* \*